United States Patent Office 3,131,657
Patented May 5, 1964

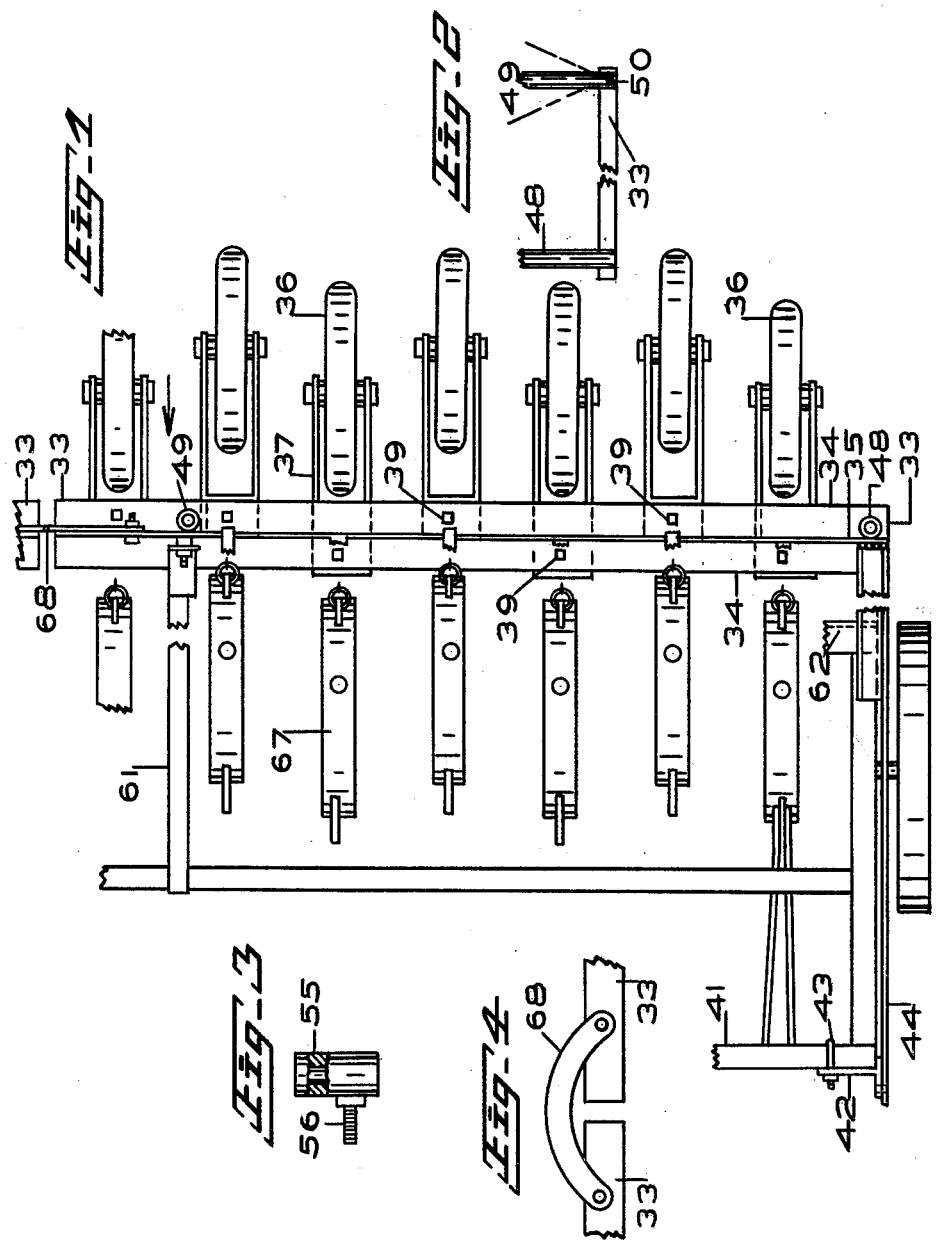

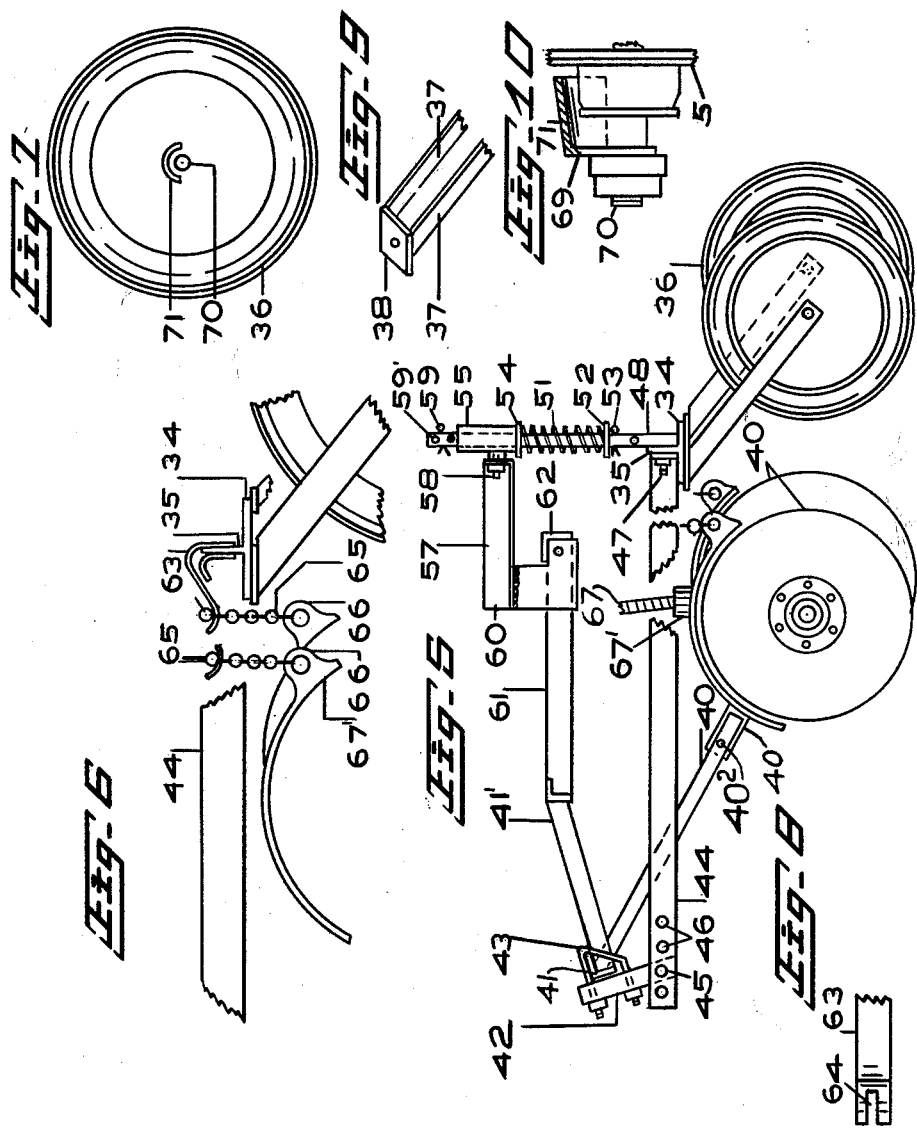

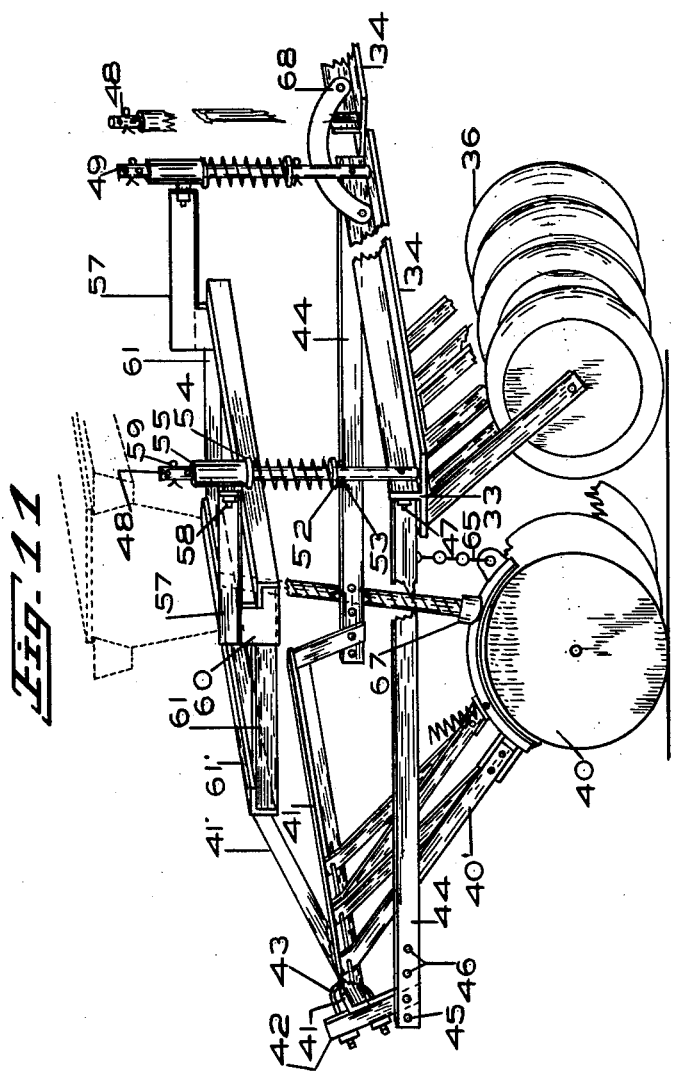

3,131,657
PRESS WHEEL AND DEPTH CONTROL ATTACHMENT FOR SEED GRAIN DRILLS
George Henry Morris, Yorkton, Saskatchewan, Canada
Filed Sept. 19, 1960, Ser. No. 56,764
2 Claims. (Cl. 111—59)

This invention relates to a press wheel attachment for a seeder drill, and including depth control by the attachment for the drill.

In a co-pending application there has been disclosed a series of press wheels attachable as a unit in following supporting relation to a disk implement with seeder attachment, and by which the seeding depth may be controlled.

The present device is concerned with application of such an attachment to a seeder drill by which support is rendered by the attachment to the drill to limit the depth of penetration in the soil of the seed drills and obtain uniform seeding depth.

In the drawings, wherein is illustrated a preferred embodiment of the invention, FIG. 1 is a top plan view illustrating attachment of a press wheel section embodying my depth control to a seeder unit, shown in part broken away and with parts omitted.

FIG. 2 is a detail rear view showing attachment of the depth control standards on the press wheel section frame, shown as broken away.

FIG. 3 is an enlarged side view, in part sectioned, of a connecting sleeve coupling for attachment of the depth control uprights of the press wheel section to the disker frame.

FIG. 4 shows an enlarged side view of fragments of the meeting ends of adjacent press wheel section transverse frame bars and a connecting link between the bars.

FIG. 5 is an end view of a press wheel section illustrated as in attachment to a seeder, shown broken away in part and with parts only of the seeder shown.

FIG. 6 is an enlarged end view showing the connection of the press wheel frame to the seeder boots of a disk assembly of the seeder for depth control, shown broken away and including a fragment of a press wheel connecting side frame bar.

FIG. 7 is a side view of a single wheel of a press wheel section, and including an axle dirt protector.

FIG. 8 is an enlarged plan view of a fragment of a finger used in the seeding depth control connections.

FIG. 9 shows a perspective view, broken away, of a fork for mounting a press wheel.

FIG. 10 is an enlarged side view showing the wheel protecting cap.

FIG. 11 is a perspective view of the press wheel attachment, shown with parts broken away and with parts omitted, and with the press wheels and disks shown turned at an angle relative to the frame for convenience of illustration, and including a fragment in dashed lines of the seed box.

In the drawings is illustrated a press wheel section in accordance with the present invention attached in following relation to a section of a seeder drill, and showing application of the depth control to such an implement. In this showing when the seed drill section drops or rises as a result of inequalities in the ground level this would normally result in unequal penetration by the seed drills with resulting unequal depth of seeding. In the present arrangement this is offset by the depth control. A single press wheel section is shown, one of a series of two or more such sections connected for travel abreast and combining with seeder drill sections in following relation to which the press wheel section travels.

The press wheel section includes a transverse bar 33, T shaped in cross section, having horizontal and vertical wings 34 and 35. Attached to the bar 33 are press wheels 36 mounted for rotation in forked brackets, each of which consists of arms 37 fixed to plates 38 that are attached to a horizontal wing 34 of the frame bar free to swing laterally on bolts 39, the press wheels being set sufficiently to the rear of the seeder drill to allow the seeder disks 40 to be raised without interference, said disks being carried by the seeder drill by means not shown for convenience of illustration. It is to be understood that in conventional mountings for disks and seed boots of this kind the supporting arms are pivotally attached to the seeder frame, and that the disks and seed drills would be normally held in working relation to the ground by springs of the type, for example, as shown at 81, 82 in U.S. Patent 2,221,909 and/or 76, 77 in U.S. Patent 2,924,188. The press wheels are alternately staggered, as shown in FIGURE 1.

To each end of a cross frame bar 41 of the seeder drill is attached a depending arm 42 by a clamp 43, and to each of these arms pivotally attaches a connecting bar 44 by a bolt 45 engageable in one or other of several openings 46 in the bar 44, it being understood that this arrangement is duplicated for connection with each end of the press wheel section. The rear end of the connecting bar 44 pivotally attaches by a bolt 47 to the vertical wing 35 of the bar 33 at or near the end, this being duplicated at both ends of the transverse bar.

On the bar 33 are two uprights 48 and 49. The upright 48 is rigidly attached, as by welding, to the horizontal plate 34 of the transverse bar, and the upright 49 pivots sidewise on the vertical wing 35 of the bar, as shown in FIGURE 2, attached by a pin 50. The sidewise pivotal attachment of the upright 49 provides a non rigid mounting without interference with the essential functioning of the associated parts when one end of the press wheel attachment is traveling lower than the other. On each of these uprights is a coiled spring 51 supported on a washer 52 held by a cotter pin 53 engageable in one or other of several openings in the uprights.

Above the springs 51 on washers 54 are slidable sleeve couplings 55 that have threaded laterally projecting shanks 56 (FIG. 3) secured thereto, these shanks being used for attachment to bars 57 by nuts 58. This is designed to provide the desired pressure on the press wheels by the springs 51. The amount of downward movement of the press wheel sections in relation to the seeder sections is controlled by cotter pins 59 placed in one or other of several openings 59' in the uprights.

The bars 57 each has secured thereto an angular bracket 60 for fixed attachment by an arm 61 to a frame cross bar 62, and by a bar 41' to the cross frame bar 41, the bar 41' attaching to a rear cross bar 61' that is parallel with the bar 62, it being understood this structure is duplicated for each end of the press wheel section.

On the vertical wing 35 of the bar 33 are attached a series of bent fingers 63, each having a slot 64 (FIG. 8) in which is engageable one or other of the links of a chain 65 attached to a drag chain lug 66 that is pivotally carried by arms 67 of a seed boot 67' of the seeder, the seed boot being of a conventional type, the boot forwardly pivoting on an arm 40 (FIG. 5) attached to the seeder drill frame bar 41 by a lug 40' fixed to the boot and a pivot pin 40" connecting the lug and arm. In this arrangement the depth of seeding is controlled by the chains 65, these being capable in their attachment to the fingers 63 of being lengthened or shortened to vary the seeding depth.

For attachment of a press wheel section to an adjoining section a bar 68 is pivotally attached to the meeting ends of the press wheel frame bars, as in FIGURE 4.

In FIGURE 10 is shown a dirt protector to be attached over the wheel bearings, FIGURES 7 and 10. Each of these consists of an arm 69 engageable on the wheel axle 70, the arm including an integral curved cap 71.

This seeder press wheel section and depth control can be attached with minor changes to most seeder drills, and for which step down axles could be provided and the frame height maintained.

When the seeder drill section drops the weight of the drill section is supported by the press wheel section, this weight being transferred by the bars 44, and the bars formed by the assemblies 41', 61 and 57, to the uprights 48 and 49 and to the frame bar 33, so that the drill section would have to raise the press wheel section off the ground before it could sink, the weight of the press wheel section being balanced against the drill section. The pins 59 serve as stops to limit the upward movement of the sleeve couplings 55 during this weight supporting movement. At the same time the seeder boots 67 are supported by the fingers 63 and chains 65 from the press wheel frame bar 33 and the drop of the seeder disks and boots is minimized, with resulting uniformity of furrow and seed depth.

What I claim and wish to secure by Letters Patent is:

1. In a seeder drill having disks and seed boots and arms by which the disks and seed boots may be forwardly pivotally suspended from the seeder drill, and a press wheel section, the seeder drill having a cross frame bar and the press wheel section having a transverse bar and a series of press wheels mounted to swing laterally in supporting relation thereto, said transverse bar having forwardly extending arms fixed thereto by which the press wheel section may be pivotally attached in following relation to the seeder drill cross frame bar, means supporting the seeder drill by the press wheel section, said means comprising a pair of spaced uprights mounted on the transverse frame bar at the end portions thereof, sleeve couplings vertically slidable on the uprights, rearwardly extending bars fixed to the seeder drill cross frame bar, means fixedly connecting said rearwardly extending bars to the sleeve couplings, means limiting the upward movement of the sleeve couplings on the uprights, and means rearwardly suspending the seeder disks and seed boots from the transverse frame bar.

2. A seeder drill and press wheel section as set out in claim 1 and in which the means suspending the seed disks and boots includes fingers fixed to the transverse frame bar forwardly projecting and chains attaching the boots to said fingers.

References Cited in the file of this patent
UNITED STATES PATENTS

| | | |
|---|---|---|
| 799,676 | Roby | Sept. 19, 1905 |
| 1,544,632 | Branson | July 7, 1925 |
| 1,633,388 | Silver | June 21, 1927 |
| 1,639,307 | Neu | Aug. 16, 1927 |
| 2,115,220 | Stewart | Apr. 26, 1938 |
| 2,140,144 | Silver | Dec. 13, 1938 |
| 2,221,909 | Clanin | Nov. 19, 1940 |
| 2,308,281 | Green | Jan. 12, 1943 |
| 2,574,385 | Gilreath | Nov. 6, 1951 |
| 2,657,652 | Graham | Nov. 3, 1953 |
| 2,704,524 | McIntyre | Mar. 22, 1955 |
| 2,924,188 | Hodges | Feb. 9, 1960 |
| 2,990,186 | Gandrud | June 27, 1961 |